United States Patent Office 3,645,978
Patented Feb. 29, 1972

3,645,978
POLYIMINOHYDANTOINS AND METHOD OF PREPARATION
James M. Craven, Wilmington, Del., assignor to E. I. du Pont de Nemours and Company, Wilmington Del.
No Drawing. Filed Aug. 26, 1970, Ser. No. 71,287
Int. Cl. C08g 33/02
U.S. Cl. 260—77.5 CH    6 Claims

ABSTRACT OF THE DISCLOSURE

A novel polyiminohydantoin composition which is the reaction product of a multifunctional isocyanate and a multifunctional cyanomethylamine said polymer having utility as high temperature adhesives structural laminates and as binders for laminated circuit boards.

BACKGROUND OF THE INVENTION

Polyhydantoins are known to the art as evidenced by U.S. Pats. 3,345,333 and 3,345,334 to R. J. Angelo, U.S. Pat. 3,296,208 to A. O. Rogers, and U.S. Pats. 3,397,253 and 3,448,170 to R. Merten et al. Although these polyhydantoins have excellent properties, they can only be made by reactions that produce volatile by-products. Thus, if one desired to prepare a fusible polyhydantoin precursor (either a mixture of monomer or an oligomer) and then melt it to prepare a molded object or an adhesive bond and finally heat cure it to convert it to the polyhydantoin, the evolution of volatile by-products would form gas bubbles thereby weakening any structure of which it was a part.

Poly(iminohydantoins) have been made which require the use of a basic solvent in order to effectuate polymerization—A. Oku et al., Makromol. Chem., 78, 186–193 (1964).

SUMMARY OF THE INVENTION

This invention relates to a novel polyiminohydantoin composition formed by thermally reacting a multifunctional isocyanate and a multifunctional cyanomethylamine. Substantially no volatile by-products are given off during the thermal reaction to a polyiminohydantoin which would weaken the composition. A basic solvent is also not essential to the reaction as the diisocyanate and difunctional cyanomethylamine may be mixed together and reacted in the absence of solvent. If both are solid, they can be mixed in solution, the solvent is then evaporated, and final reaction to polyiminohydantoin performed by heating.

DESCRIPTION OF THE INVENTION

The polyiminohydantoin of this invention is formed by thermally reacting a multifunctional isocyanate and a multifunctional cyanomethylamine.

Multifunctional cyanomethylamines which are suitable for use in this invention have the general structure $$R—(NHCH_2CN)_n$$

where R can be an alkyl radical from 2–40 carbon atoms,

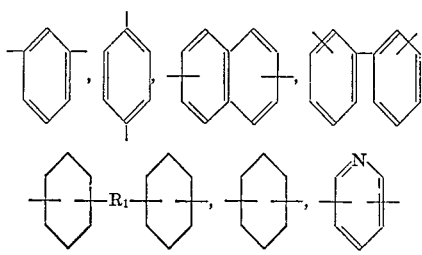

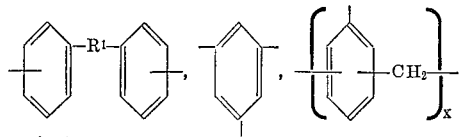

where $x$ is 1–100 wherein $R^1$ can be alkylene radical containing 1–4 carbon atoms,

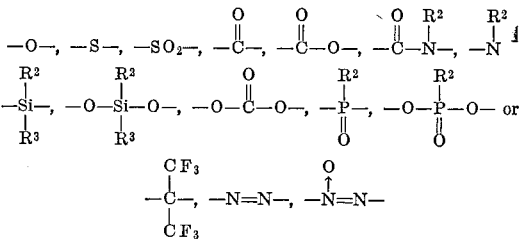

where $R^2$ and $R^3$ are individually selected from the group consisting of an alkyl radical having 1–3 carbon atoms and an aryl radical, and where $n$ is any integer greater than 1.

Other functional groups may be attached to R so long as their reaction speed with an isocyanate group is less than that of the amine groups.

Preferred multifunctional cyanomethylamines are difunctional cyanomethylamines, especially

and

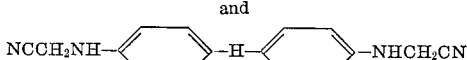

Multifunctional isocyanates suitable for use in the invention are any aromatic, aliphatic, alicyclic or heterocyclic isocyanates. The isocyanate selected must have at least 2 isocyanate functionalities.

The isocyanate should have the general structure $$R^4—(NCO)_n$$

where $n$ is an integer greater than 1 and where $R_4$ can be an alkylene radical having 2–40 carbon atoms,

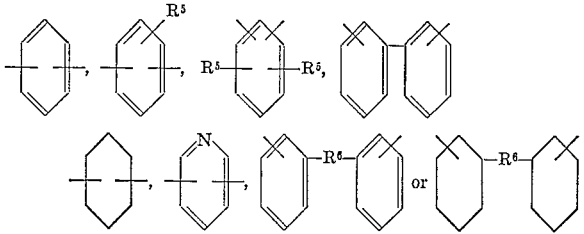

wherein $R^6$ is either an alkylene radical containing 1–4 carbon atoms,

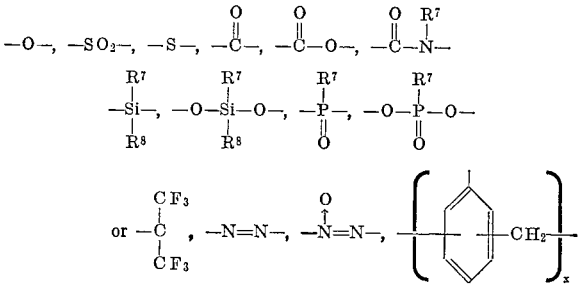

and $R^5$ is an alkyl radical of 1–3 carbon atoms and $R^7$ and $R^8$ are individually selected from the group consisting of an alkyl radical having 1–3 carbon atoms and an aryl radical.

The following are organic diisocyanates useful in this invention:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis(cyclohexyl isocyanate),
4,4'-methylene-bis(cyclohexyl isocyanate),
4,4'-ethylene-bis(cyclohexyl isocyanate),
4,4'-propylene-bis-(cyclohexyl isocyanate),
bis-(para-isocyano-cyclohexyl)sulfide,
bis(para-isocyano-cyclohexyl)sulfone,
bis-(para-isocyano-cyclohexyl))ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide
bis-(4-isocyano-phenyl)-N-phenyl amine,
bis-(4-isocyano-phenyl)-N-methyl amine,
3,3'-dimethyl-4,4'-diisocyano biphenyl,
3,3'dimethoxy-biphenylene diisocyanate,
2,4-bis-($\beta$-isocyano-t-butyl)toluene,
bis-(para-$\beta$-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$ and

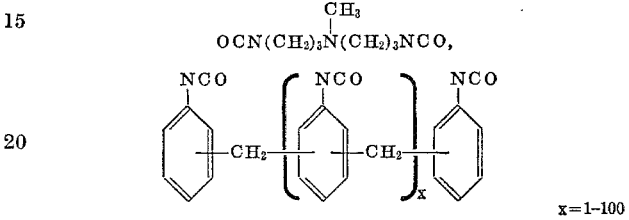

x=1-100

Preferred isocyanates are toluene-2,4-diisocyanate and 4,4'-methylenebis(phenylisocyanate).

The reaction of the multifunctional isocyanate and the multifunctional cyanomethylamine is a thermal cure at 130° to 300° C. for about 1 to 24 hours.

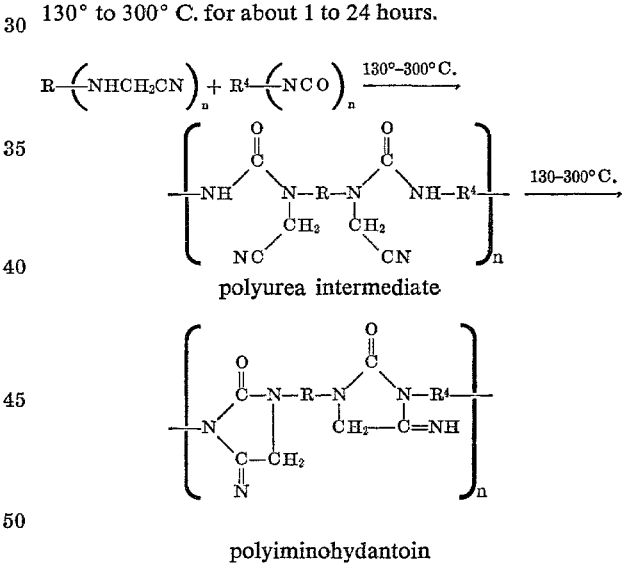

polyiminohydantoin where $n$ is an integer sufficient to give the polymer a molecular weight (number average) of greater than 2000 where R can be an alkyl radical from 2–40 carbon atoms,

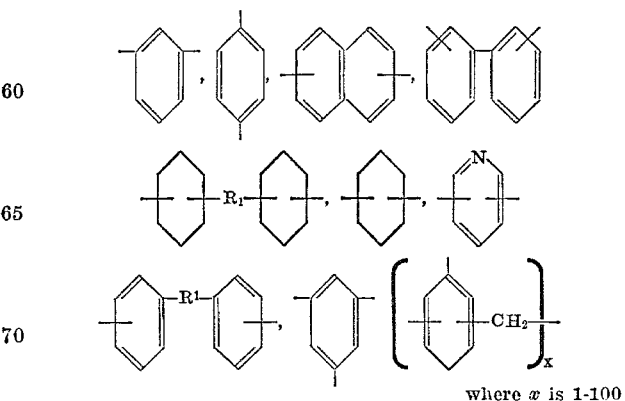

where $x$ is 1-100 wherein $R^1$ can be an alkylene radical containing 1–4 carbon atoms.

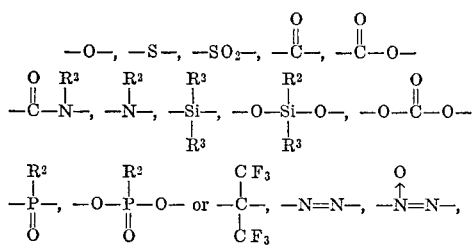

where $R^2$ and $R^3$ are individually selected from the group consisting of an alkyl radical having 1–3 carbon atoms and an aryl radical, and $R^4$ can be an alkylene radical having 2–40 carbon atoms,

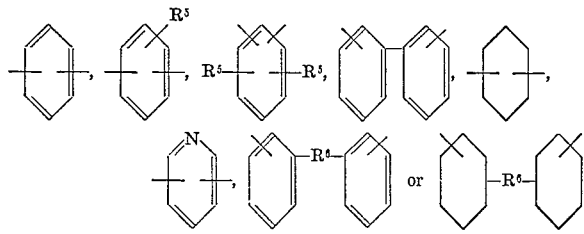

wherein $R^6$ is either an alkylene radical containing 1–4 carbon atoms.

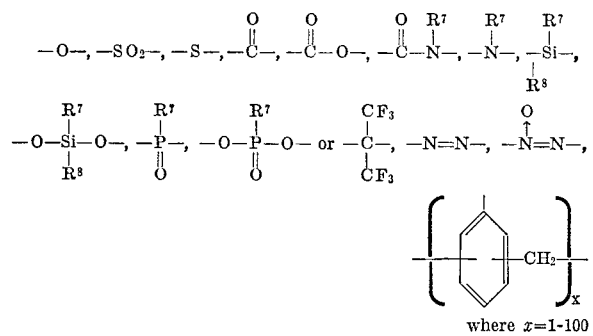

where $x=1$–$100$ and $R^5$ is an alkyl radical of 1–3 carbon atoms and $R^7$ and $R^8$ are individually selected from the group consisting of an alkyl radical having 1–3 carbon atoms and an aryl radical.

If the value of $n$ is 2 for the multifunctional isocyanate and multifunctional cyanomethylamine, then preferably equimolar amounts of the isocyanate and cyanomethylamine should be used although up to a 10% excess by molar weight of either reactant can be tolerated in some cases without substantially detracting from the properties of the polyiminohydantoin. When $n$ is greater than 2 for either of the reactants, then exact stoichiometry is not as critical and a 20–30% excess of either reagent can often be tolerated. However, for best properties of the polyiminohydantoin it is usually best to use sufficient cyanomethylamine and isocyanate so that there are equivalent amounts of —NCO and —NHCH$_2$CN groups. For example if $n=3$ for the multifunctional isocyanate and $n=2$ for the multifunctional cyanomethylamine, then the molar ratio of multifunctional isocyanate to multifunctional cyanomethylamine should be about 2:3.

If the reactants are liquids, they can simply be mixed in the correct ratio, poured into a mold or other container and then heated to produce a polyiminohydantoin object. If one is a liquid and the other a solid, it is often possible to produce a solution of one in the other and treat as before. If the solid is insoluble in the liquid, it can often be milled or ground into the liquid to make a dispersion or paste, which can then be heated to prepare the polyiminohydantoin. If both reactants are solids, they can be ground together to give a finely powdered mixture and then compression molded at a temperature high enough to melt the mixture and convert it to the polyiminohydantoin.

Another technique that is often convenient when one or both of the reactants are solids is to use a solvent. The multifunctional isocyanate and multifunctional cyanomethylamine are dissolved in a solvent and the solutions mixed. The resulting solution can then be applied to glass fabric, graphite fabric, polyamide fabric or any surface and the solvent evaporated. Any tendency for either the isocyanate or the cyanomethylamine to be deposited as a crystalline solid (which sometimes happens if one component has a high melting point) can be avoided by first heating the solution for a few minutes at the boiling point to get partial conversion to the polymer, which effectively inhibits any crystallization of the reactants. However, it is often desirable to heat the solution too long or too high a temperature since too much conversion to polyurea or premature conversion to polyiminhydantoin can make the composition infusible. One useful embodiment of the invention is a fusible mixture of reactants that can be melted to allow molding, laminating or adhesive bonding and then further heated to convert it to a higher melting or infusible polyiminohydantoin, without producing any volatile by-products that would cause voids or bubbles. It is therefore desirable to remove solvent before converting the mixture to an infusible condition. Any solvent capable of dissolving the cyanomethylamine and isocyanate is useful so long as the solvent does not react with the isocyanate or the cyanomethylamine and so long as it can be evaporated at a temperature low enough to avoid conversion of the mixture to an infusible state. Typcial solvents are toluene, xylene, methyl ethyl ketone, acetone, tetrahydrofuran, ethylene glycol dimethyl ether, chloroform and the like. After the solvent has been evaporated either at room temperature or in an oven at up to about 130° C., the composition can then be molded, laminated or used to make adhesive bonds at 100–300° C., usually about 150–200° C.

Copolymers can be made by reacting a mixture of multifunctional isocyanates with a mixture of multifunctional cyanomethylamines. Copolymers can also be made by incorporating a third multifunctional compound reactive with either the isocyanate or the cyanomethylamine. Examples are diamines, diols, dithiols, isothiocyanates etc.

Additives such as antioxidants, pigments, dyes, other polymers or resins, can also be added to achieve desired appearance or physical properties according to methods well known in the polymer art.

Utility

The polyiminohydantoins of this invention have particular utility as high temperature adhesives, structural laminates, and as the binder for laminated circuit boards.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept. All parts are by weight.

Example 1

A mixture of 43.7 g. sodium bisulfate and 40 ml. water was treated with 34.1 ml. 37% formaldehyde. The resulting, clear, hot solution was then added to a solution of 21.7 g. p-phenylene diamine in 100 ml. water at 70° C. and the solution stirred for 30 minutes. Then a solution of 26.1 g. potassium cyanide in 55 ml. water was added, and the mixture stirred and heated on a steam bath for 1 hour. The rection mixture was then cooled to room temperature, allowed to stand for a few hours, and then filtered to collect the reaction product. The reaction product was then washed with water, dried in a stream of air, recrystallized from an acetone and water mixture and dried in vacuum to give p-phenylenebis(aminoacetonitrile), weighing 28.5 g. and melting at 169–170° C.

A mixture of 0.934 g. p-phenylenebis(aminoacetonitrile) (prepared as described above), 1.255 g. methylenebis(4-phenylisocyanate), and 3 ml. ethylene glycol dimethyl ether was heated gently to boiling for a few minutes to give a clear solution and then cooled to room temperature. The solution was then spread on glass plates and dried in an oven at 125° C. for 100 min. When the plates were pressed together at 350° F. for 80 min. at 50–500 p.s.i., the adhesive layer bonds the two glass plates together with a clear, essentially void-free layer of polymer which was substantially in the polyiminohydantoin form.

Example 2

A suspension of 40.0 g. 4,4'-oxydianiline in 200 ml. water was heated at 70° C. and treated with a solution of 43.7 g. sodium bisulfite and 34.1 ml. 37% formaldehyde in 40 ml. water. The mixture was heated 1 hour, 17 minutes on a steam bath. Then a solution of 26.1 g. potassium cyanide in 55 ml. water was added and the solution stirred and heated on a steam bath for 1 hour. The mixture was then filtered to isolate the crystalline 4,4'-oxybis(phenylaminoacetonitrile), which was then washed with water, dried in air, recrystallized from a mixture of methanol and isopropyl alcohol, dried in air and then in vacuum. About 30.8 g. of purified 4,4'-oxybis(phenylaminoacetonitrile) melting at 149.5–151° C. was obtained.

A mixture of 2.783 g. of 4,4'-oxybis(phenylaminoacetonitrile), 1.742 g. toluene-2,4-diisocyanate and 10 ml. ethylene glycol dimethyl ether was stirred together to give a clear solution and then spread on glass plates and dried in an oven at 60° C. for 30 minutes, 60–125° C. for 7 minutes and 125° C. for 30 minutes. When the glass plates are pressed together for 1 hour at 177° C. at about 50 p.s.i., they become bonded together by a clear, essentially void-free layer of adhesive which is substantially the polyiminohydantoin.

The invention claimed is:

1. Infusible polyiminohydantoin consisting essentially of the formula

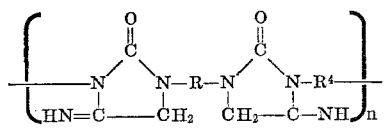

wherein $n$ is an integer sufficient to give the polymer a number average molecular weight of greater than 2000 and where R is a carbocyclic aromatic radical and, where $R^4$ is selected from the group consisting of an alkylene radical having 2–40 carbon atoms,

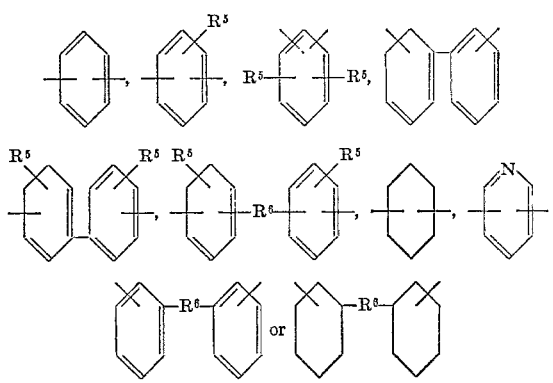

wherein $R^6$ is either an alkylene radical containing 1–4 carbon atoms,

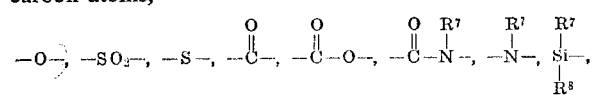

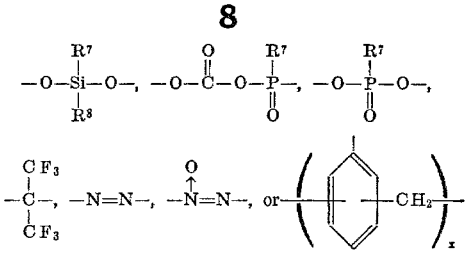

wherein $x$ is 1–100.

and $R^5$ is an alkyl radical of 1–3 carbon atoms and $R^7$ and $R^8$ are individually selected from the group consisting of an alkyl radical having 1–3 carbon atoms and an aryl radical.

2. The polyiminohydantoin of claim 1 wherein R is

and $R_4$ is selected from the group consisting of

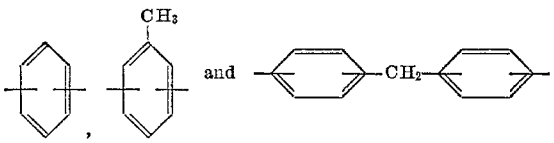

3. The polyiminohydantoin of claim 1 wherein R is

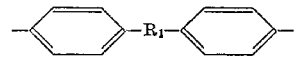

where $R_1$ is selected from the group consisting of —CO—, —CH$_2$—, —S—, —O—, —SO$_2$—, and

and $R_4$ is selected from the group consisting of

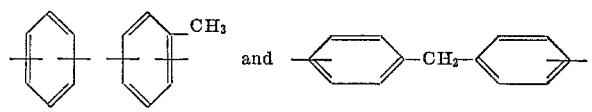

4. The process of preparing the infusible polyiminohydantoin of claim 1 capable of acting as an adhesive comprising reacting substantially stoichiometric amounts of at least (A) one carbocyclic aromatic compound having two functionalities of —NHCH$_2$CN with (B) at least one isocyanate of the formula $$R^4—(NCO)_n$$

where $n$ is an integer greater than 1 and where $R^4$ can be an alkylene radical having 2–40 carbon atoms,

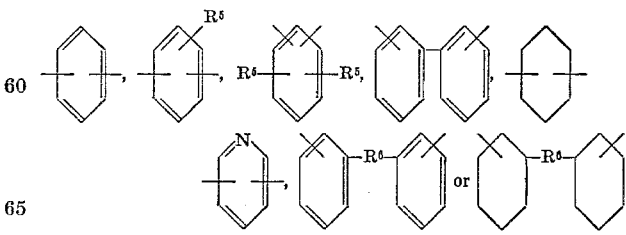

wherein $R^6$ is either an alkylene radical containing 1–4 carbon atoms,

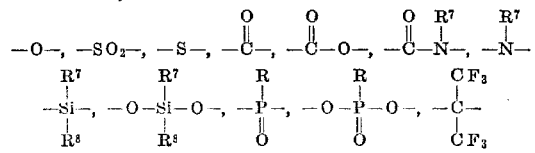

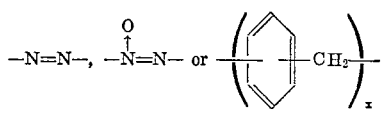

wherein $x$ is 1–100 and $R^5$ is an alkyl radical of 1–3 carbon atoms and $R^7$ and $R^8$ are individually selected from the group consisting of an alkyl radical having 1–3 carbon atoms and an aryl radical, at a temperature between about 130° C. and 300° C.

5. The process of claim 4 wherein the compound comprising (A) is at least one member of the group consisting of

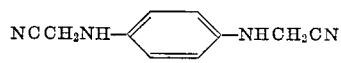

and

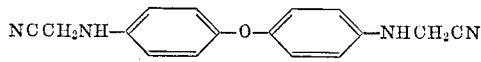

6. The process of claim 5 wherein the isocyanate (B) is at least one member of the group consisting of methylene-bis(4-phenyl isocyanate) and toluene-2,4-(diisocyanate).

References Cited
UNITED STATES PATENTS

| | | | |
|---|---|---|---|
| 3,345,333 | 10/1967 | Angelo | 260—47 |
| 3,345,334 | 10/1967 | Angelo | 260—47 |
| 3,397,253 | 8/1968 | Merten et al. | 260—830 |

WILLIAM H. SHORT, Primary Examiner

L. L. LEE, Assistant Examiner

U.S. Cl. X.R.

117—126 GR, 138.8 N, 161 UN, 228; 161—182, 192, 227; 260—30.4 N, 32.8 N, 33.8 R, 37 N, 47 R, 47 CB, 65, 78.4 N, DIG 34